(12) United States Patent
Kaneko

(10) Patent No.: US 6,466,860 B2
(45) Date of Patent: Oct. 15, 2002

(54) AUTOMATIC STOP/RESTART DEVICE OF VEHICLE ENGINE

(75) Inventor: Kakuzou Kaneko, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 47 days.

(21) Appl. No.: 09/789,011

(22) Filed: Feb. 21, 2001

(65) Prior Publication Data

US 2002/0116113 A1 Aug. 22, 2002

(30) Foreign Application Priority Data

Feb. 21, 2000 (JP) .................................. 2000-043372

(51) Int. Cl.$^7$ ........................... F02D 29/02; F02N 11/08
(52) U.S. Cl. ..................... 701/112; 701/113; 477/99; 307/10.6; 290/38 E
(58) Field of Search ........................ 701/112, 113, 701/53, 54; 477/99, 111, 205; 123/179.4; 307/10.6; 290/38 E

(56) References Cited

U.S. PATENT DOCUMENTS 6,275,759 B1 * 8/2001 Nakajima et al. ............. 701/54

FOREIGN PATENT DOCUMENTS

JP 2000-274273 10/2000

* cited by examiner

Primary Examiner—Andrew M. Dolinar
(74) Attorney, Agent, or Firm—Foley & Lardner

(57) ABSTRACT

When a restart of an engine is performed due to the requirement of a vehicle state unintended by a driver, a creep force which is initially generated is suppressed to a small value so that a vehicle is prevented from moving off.

When automatic stop conditions are satisfied, the engine 1 stops, and when restart conditions are satisfied, a starting motor 2 is started so as to restart an engine 1.

A condition for engine restart unintended by the driver is determined, and during a predetermined time when the engine restarts unintended by the driver, a smaller creep drive force is generated than when the engine restarts which is intended by the driver.

During this predetermined time, only the motor 2 is rotated without starting the engine, and the creep force is suppressed low.

13 Claims, 4 Drawing Sheets

AUTOMATIC STOP/RESTART DEVICE OF VEHICLE ENGINE

FIELD OF THE INVENTION

This invention relates to a device for automatically stopping and restarting an engine.

BACKGROUND OF THE INVENTION

Tokkai 2000-274273 published by the Japanese Patent Office in 2000 discloses a vehicle engine automatic stop/restart device wherein the engine of a vehicle can restart without torque shock due to a gear change-over by preventing the change-over of an automatic transmission.

In this device, when the engine automatically stops with the automatic transmission in a drive range, a restart is performed in the drive range. Hence, a creep force is generated immediately after restart, and a torque shock due to E a gear change-over does not occur.

However, in a vehicle equipped with an automatic stop/restart device of this type, the engine is restarted based on the command of a control unit irrespective of the intention of the driver, for example, to charge the battery.

If the brake pedal depression force is weakened while the driver remains unaware of it when the engine has automatically stopped, the vehicle will gradually move off when the engine is restarted, for example, to charge the battery, and an uncomfortable feeling is given to the driver.

SUMMARY OF THE INVENTION

It is therefore an object of this invention to suppress a creep force small and to prevent a vehicle moving off when an engine restarts unintended by a driver.

In order to achieve above object, this invention provides an engine automatic stop/restart device for an engine of a vehicle, the vehicle having a drive wheel, and a transmission mechanism which transmits a creep force to the drive wheels according to the rotation of an engine.

The automatic stop/restart device comprises a motor for starting the engine, a sensor which detects if the transmission mechanism is in a drive range wherein the creep force is transmitted to the drive wheel, a sensor which detects that a brake pedal is depressed, and a microprocessor.

The microprocessor is programmed to stop the running of the engine automatically when the vehicle is stationary with the brake pedal depressed, determine whether a driver or a vehicle state requires a restart of the engine, restart the engine to increase the rotation speed of the engine rapidly by the motor when the driver requires the restart of the engine, and restart the engine to increase the rotation speed of the engine more slowly by the motor when the vehicle state requires the restart of the engine with the transmission mechanism in the drive range.

DESCRIPTION OF THE PREFERRED EMBODIMENTS

Figure 1:
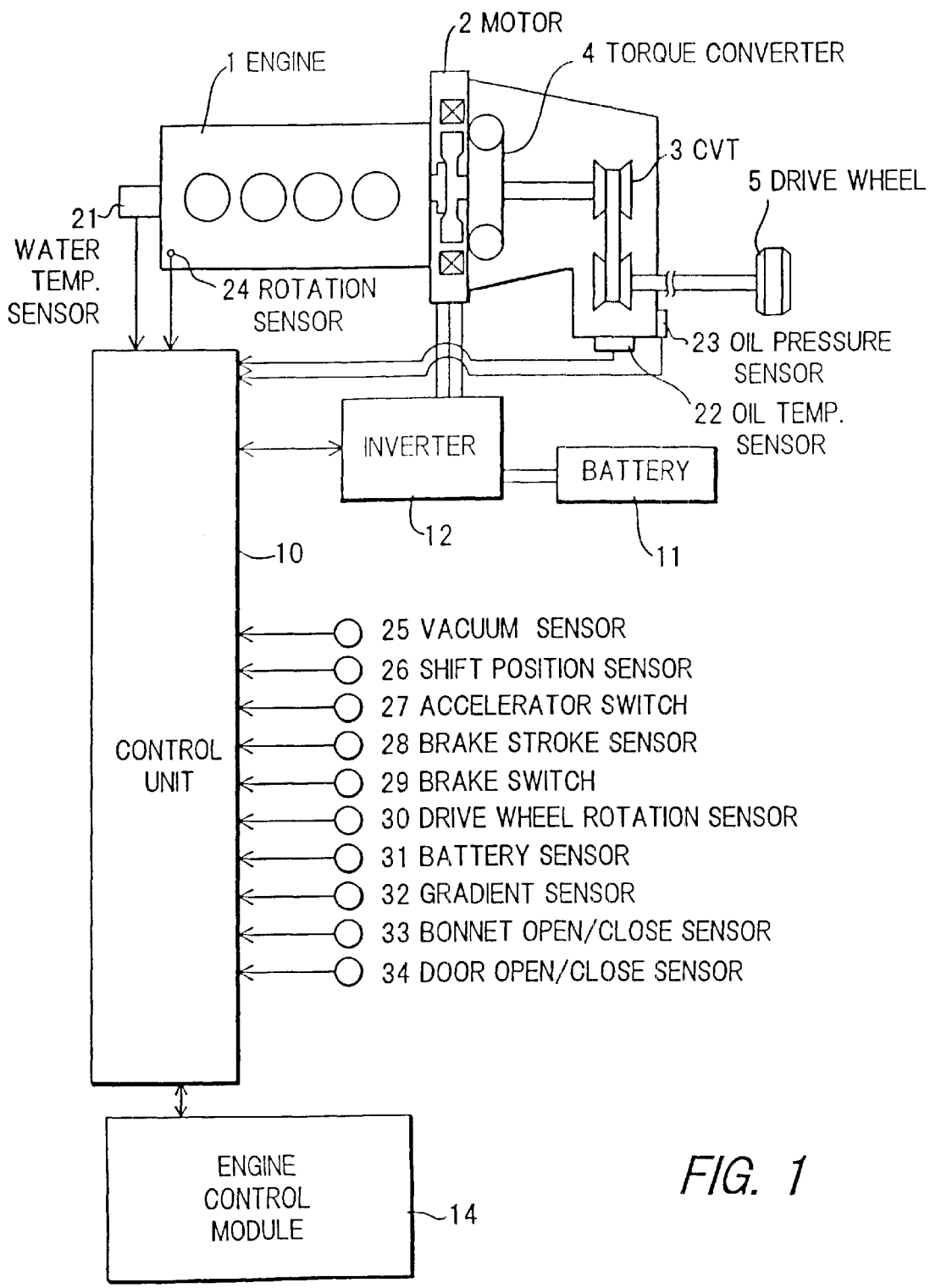
FIG. 1 is a schematic diagram of an engine automatic stop/restart device of a vehicle according to this invention.

Referring to FIG. 1 of the drawings, a vehicle drive system to which this invention is applied comprises an engine 1, an induction motor 2 which is connected with the engine 1, a continuously variable transmission (CVT) 3 and a torque converter 4. The engine 1 may be a gasoline engine or a diesel engine. The continuously variable transmission 3 is connected to the induction motor 2 via the torque converter 4. The rotation of an output shaft of the continuously variable transmission 3 is transmitted to drive wheels 5 of the vehicle. Instead of the continuously variable transmission 3, a stepwise automatic transmission may be used. Forward motion and reverse motion of the vehicle is changed over by a forward/reverse change-over mechanism, not shown, interposed between the engine 1 and continuously variable transmission 3.

The induction motor 2 functions as a motor/generator. The induction motor 2 is connected to an output shaft of the engine either directly, or via a gear and a chain. The induction motor 2 functions as a motor, starting the rotation of the engine 1, and also supplements the output of the engine 1 if necessary. Further, the induction motor 2 functions as a generator driven by the engine 1 and charges a battery 11 when the state of charge (SOC) of the battery 11 decreases. It also generates power by recovering energy when the vehicle is coasting and charges the battery 11.

The continuously variable transmission 3 comprises a pair of variable pulleys and a belt looped over these pulleys. By varying the diameters of these variable pulleys, the speed ratio of the rotating pulleys changes. The speed ratio is set to vary according to running conditions. The speed ratio is controlled by adjusting the pulley width, i.e., the groove width of the variable pulleys by oil pressure.

A control unit 10 comprises a microprocessor provided with a central processing unit (CPU), a read-only memory (ROM), a random access memory (RAM), and an input/output interface (I/O interface).

The control unit 10 controls the induction motor 2 via an inverter 12. When the induction motor 2 functions as a motor, the control unit 10 commands the inverter 12 to convert the direct current from the battery 11 into alternating current, and supply alternating current to the induction motor 2. When the induction motor 2 functions as a generator, the control unit 10 commands the inverter 12 to supply an exciting current to the induction motor 2, and convert alternating current generated by the induction motor 2 into direct current to charge the battery 11.

The control unit 10 automatically stops the engine 1 by commanding an engine control module 14, when, for example, the vehicle temporarily stops at a road crossing. The automatic stopping of the engine on such an occasion is referred to as an idling stop. The control unit 10 drives the induction motor 2 to automatically restart the engine 1 when, for example, the accelerator pedal is depressed or the battery SOC drops.

To perform this control, various signals are input from sensors to the control unit 10. They are a water temperature sensor 21 which detects an engine cooling water temperature, an oil temperature sensor 22 which detects an oil temperature of the continuously variable transmission 3, an oil pressure sensor 23 which detects an oil pressure of the continuously variable transmission 3, a rotation sensor 24 which detects a rotation speed of the engine 1, a vacuum sensor 25 which detects a negative pressure of a brake booster, a shift position sensor 26 which detects a position of a shift lever, an accelerator switch 27 which detects that an accelerator pedal is depressed, a brake stroke sensor 28 which detects a brake pedal depression amount, a brake switch 29 which detects that a brake pedal is depressed, a drive wheel rotation sensor 30 which detects a rotation speed of the drive wheels 5, a battery sensor 31 which detects the SOC of the battery 11, a gradient sensor 32 which detects whether or not the vehicle is traveling on a gradient such as downhill, a bonnet open/close sensor 33 which detects whether a bonnet of the vehicle is open or closed, and a door open/close sensor 34 which detects whether or not doors of the vehicle are all closed.

Figure 2:
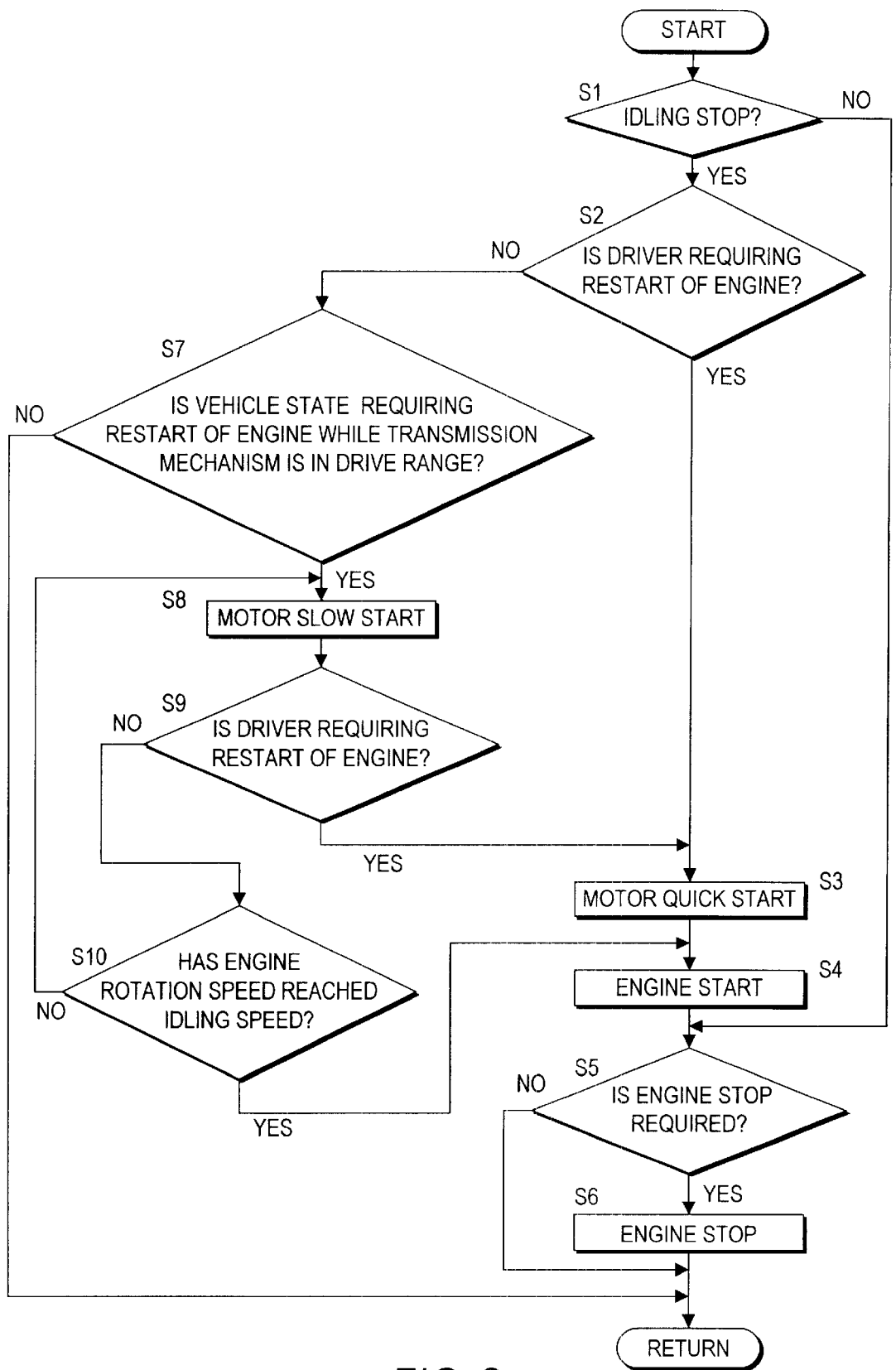
FIG. 2 is a flowchart describing an engine stop/restart control routine performed by a control unit according to this invention.

Referring to the flowchart of FIG. 2, the engine automatic stop and restart control performed by the control unit 10 will now be described.

In a step S1, it is determined whether or not the engine 1 has temporarily stopped with the transmission in a drive range, i.e., whether the vehicle is in an idling stop state. The shift position sensor 26 determines whether or not the transmission is in a drive range wherein a creep force is transmitted to the drive wheels 5. Based on signals from the engine rotation sensor 24, shift position sensor 26, drive wheel rotation sensor 30, bonnet open/close sensor 33 and door open/close sensor 34, it is determined whether or not the engine 1 has stopped while traveling. If the following conditions are all satisfied, it is determined that the engine 1 has temporarily stopped with the transmission in the drive range, and the routine then proceeds to a step S2.
(1) The engine rotation speed is 0.
(2) The vehicle speed, i.e., the rotation speed of the drive wheels, is 0.
(3) The vehicle doors are all closed.
(4) The vehicle bonnet is closed.

In the step S2, it is determined whether or not the driver is requiring an engine restart. If the driver performs an operation to start the vehicle, it is determined that the driver is requiring a restart of the engine 1.

Specifically, it is determined that the driver is requiring the restart of the engine 1 when at least one of the following conditions is satisfied.
(1) The accelerator pedal is depressed. In other words, the accelerator switch is ON.
(2) The brake is completely released. In other words, the brake switch is OFF.

When it is determined that the driver is requiring the restart of the engine 1, the routine proceeds to a step S3 and the control unit 10 commands the inverter 12 to start the induction motor 2. In this case, the rotation speed of the engine 1 increases quickly by the rotation of the induction motor 2 so that the vehicle can start rapidly, unlike the case where a vehicle state such as a drop of the battery SOC requires the restart of the engine.

Due to the rotation of the induction motor 2, a creep force is transmitted from the torque converter 4 to the drive wheels 5 via the continuously variable transmission 3. On the other hand, the engine 1 rotates together with induction motor 2. The creep force of the torque converter 4 is effectively directly proportional to the square of the increase of rotation speed of the engine.

Next, startup of the engine 1 is performed in a step S4. In the case of a gasoline engine, the startup of the engine 1 is performed by fuel injection to the engine, and ignition by a spark plug. Injection may start before ignition so that the ignition proceeds smoothly.

In this case, the control unit 10 first starts the operation of the induction motor 2 until the rotation speed reaches a predetermined idling speed, for example, 700 rpm. When it reaches 700 rpm as shown by a dotted line in the figure, the control unit 10 immediately starts the operation of the engine 1 by supplying fuel to the engine 1 as well as igniting the fuel in the engine 1.

When it is not determined that the driver is requiring the restart of the engine 1, the routine proceeds to a step S7. In the step S7, it is determined whether or not the vehicle state is requiring the restart of the engine 1 while the transmission mechanism is in the drive range.

For example, when it is necessary to charge the battery or increase the engine cooling water temperature after the engine 1 has automatically stopped, it is determined that the vehicle state is requiring the restart of the engine 1.

Specifically, when at least one of the following conditions holds, it is determined that the vehicle state is requiring the restart of the engine 1.
(1) The battery SOC is less than a predetermined SOC.
(2) The brake booster negative pressure is less than a predetermined negative pressure.
(3) The engine cooling water temperature is less than a predetermined water temperature.
(4) The transmission oil temperature is less than a predetermined oil temperature.
(5) The transmission oil pressure is less than a predetermined oil pressure.

For example, the predetermined SOC is set in the range of 30% to 40% of the full charge state, the predetermined negative pressure is set to about 180 mmHg, the predetermined water temperature is set to about 25° C., the predetermined oil temperature is set to about 25° C., and the predetermined oil pressure is set to about 0.7 MPa. Here, a "negative pressure" means a pressure difference relative to the atmospheric pressure. If a negative pressure is small, an absolute pressure is large. The predetermined negative pressure depends largely on the capacity of the negative pressure tank of the brake booster.

When the transmission mechanism is not in the drive range, or the vehicle state is not requiring the engine to restart in the step S7, the routine is terminated.

When it is determined that the vehicle state is requiring the restart of the engine 1, the routine proceeds to a step S8.

Figure 3:
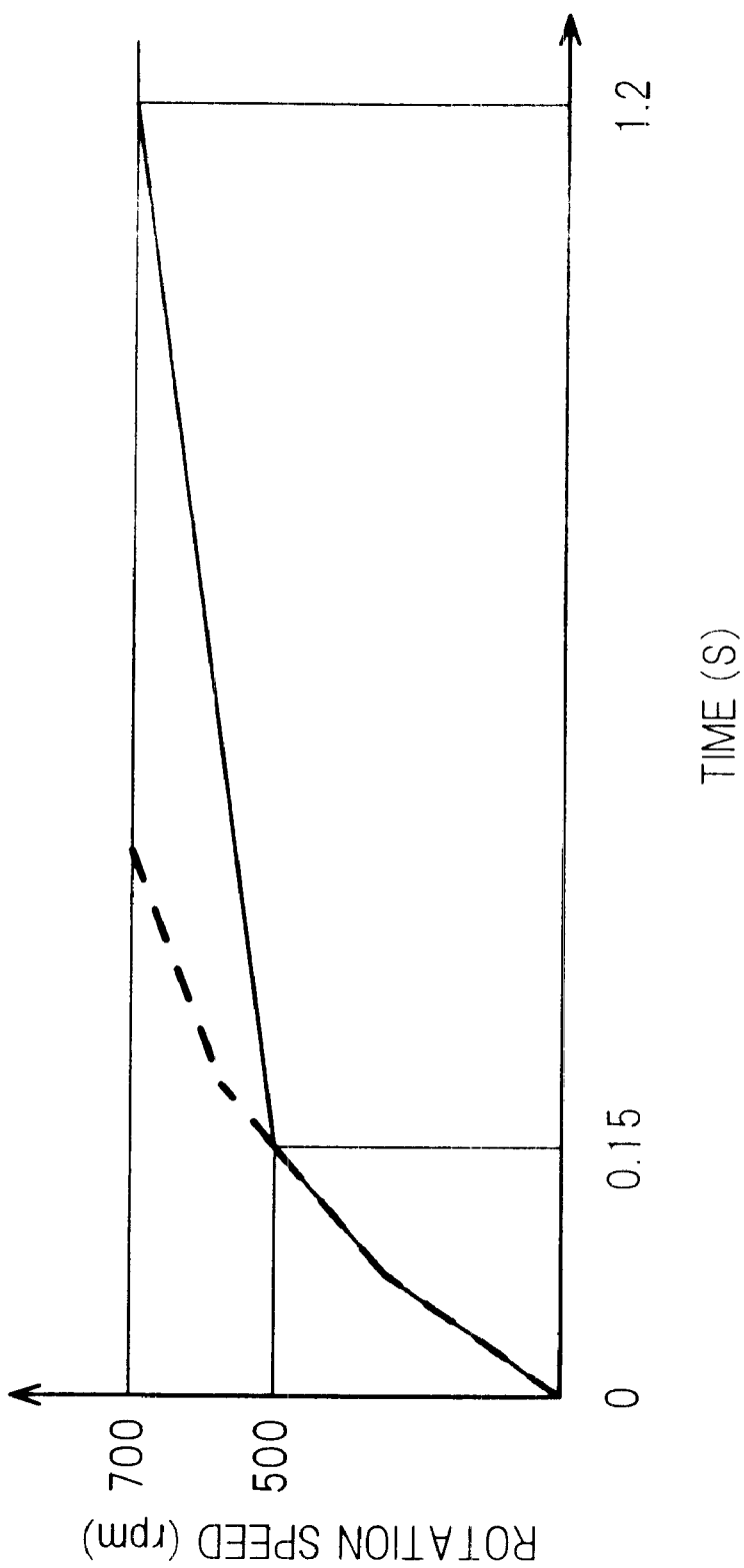
FIG. 3 is a schematic diagram of rotation speed increase characteristics when an engine is started by an automatic stop/restart device according to this invention.

In the step S8, the control unit 10 starts the operation of the induction motor 2. The control unit 10 controls the induction motor 2 via an inverter 12 so that the engine rotation speed increases slowly according to a rotation speed increase map as shown in FIG. 3.

This rotation speed increase map is stored in the control unit 10.

According to FIG. 3, the rotation speed increase map on startup is set as follows.

The engine rotation speed rapidly increases from zero to a predetermined rotation speed, e.g., 500 rpm. The rotation speed of the engine is set to reach this predetermined rotation speed in 0.15 seconds, for example. At less than this predetermined rotation speed, the rotation speed increase characteristic when the engine 1 starts due to the requirement of the vehicle state, is identical to the rotation speed increase characteristic when the engine 1 starts due to the driver's requirement.

At a speed higher than the predetermined rotation speed, however, the rotation speed characteristics differ depending upon the intention of the driver. Since the restart of the engine 1 is not required by the driver, the rotation speed increases gradually up to the predetermined idling speed, e. g., 700 rpm. The rotation speed is set to reach the predetermined idling speed in a predetermined time, e.g., 1.2 seconds. Above the predetermined rotation speed, the rate of increase in the rotation speed of the engine 1 when the vehicle state requires the restart of engine is less than the rate of increase when the driver requires the restart of the engine.

Until the engine rotation speed reaches the predetermined idling speed, startup of the engine 1 is prohibited, and the engine 1 rotates due to the rotation of the motor. As the rotation speed of the induction motor 2 is low during the predetermined time, the creep force generated in this period is a lower value than when the engine 1 starts due to the driver's requirement.

The creep force generated in the predetermined time may be as small as the extra drive force usually generated by the increase of the engine rotation speed when the air conditioner changes over from OFF to ON. If this is done, the creep force generated in this period does not give a shock to the driver.

Next, in a step S9, it is determined again whether or not the driver is requiring the restart of the engine 1. When the driver is requiring the restart of the engine 1, the routine proceeds to the step S3 where the induction motor 2 is commanded to rotate rapidly. Next, in the step S4, the operation of the engine 1 starts.

When the driver is not requiring the restart of the engine 1 in the step S9, the routine proceeds to a step S10. In the step S10, it is determined whether or not the engine rotation speed has reached the predetermined idling speed. When the engine rotation speed has not reached the predetermined idling speed, the routine returns to the step S8 and the engine rotation speed continues to increase gradually by the rotation of the induction motor 2. On the other hand, when the engine rotation speed has reached the predetermined idling speed, the routine proceeds to the step S4. In the step S4, the control unit 10 starts the operation of the engine 1 as described earlier.

Next, the routine proceeds to a step S5.

When the engine 1 has not temporarily stopped with the transmission in a drive range in the step S1, the routine proceeds directly to the step S5. In the step S5, it is determined whether or not an automatic stop of the engine 1 is required.

When the following conditions are all satisfied, the engine stops automatically.
(1) The vehicle speed is 0.
(2) The brake pedal is depressed. In other words, the brake switch is ON.
(3) The vehicle doors are all closed.
(4) The vehicle bonnet is closed.
(5) The battery SOC is equal to or greater than the predetermined SOC.
(6) The brake booster negative pressure is equal to or greater than the predetermined negative pressure.
(7) The engine cooling water temperature is equal to or greater than the predetermined water temperature.
(8) The transmission oil temperature is equal to or greater than the predetermined oil temperature.
(9) The transmission oil pressure is equal to or greater than the predetermined oil pressure.

When engine automatic stop is not requested, the vehicle starts to move off. When engine automatic stop has been requested, the routine proceeds to a step S6. Here, the engine 1 stops automatically.

Subsequently, the flowchart described above is repeated at a predetermined interval, e.g., as interrupt processing every 10 msec.

Next, the advantages of this invention will be described.

When the conditions are satisfied for restarting the engine 1 after the engine automatically stopped, the engine starts while the transmission is in a drive range. A creep force is generated due to the startup of the engine.

The engine restarts in the following two cases.

Firstly, there is the case where the driver intentionally restarts the engine. This happens when the driver shows his intention to start the vehicle by releasing the brake pedal, or depressing the accelerator pedal. The other case is when the vehicle state is requiring the restart of the engine. This occurs, for example, when the induction motor 2 generates power due to the fact that the battery SOC has fallen below the predetermined SOC. In this case, a restart is performed unintended by the driver.

Figure 4:
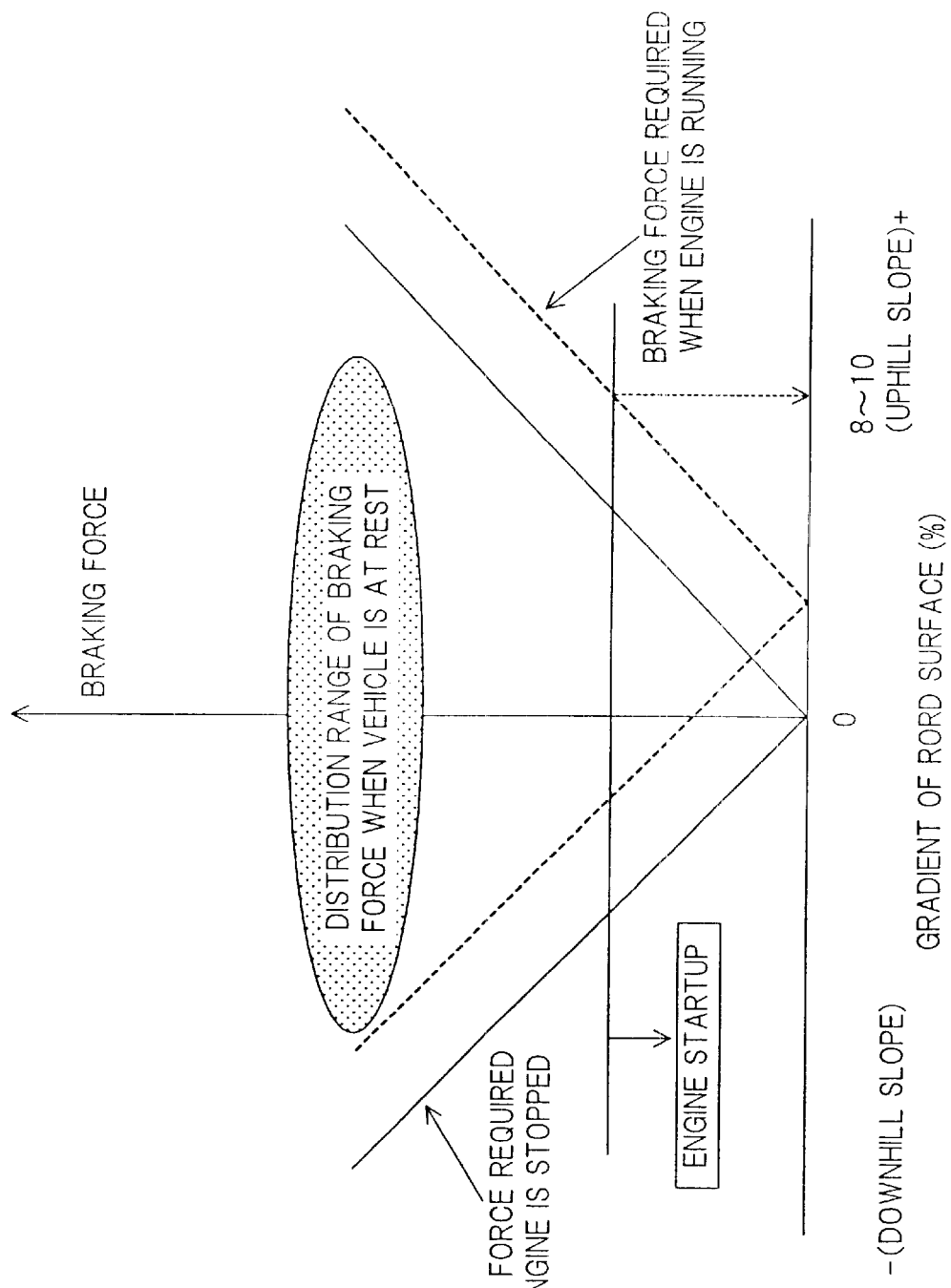
FIG. 4 is a diagram describing a relation between a road surface slope and a braking force required for keeping the vehicle stationary.

FIG. 4 shows the relation between the gradient of the road surface and the braking force required to stop the vehicle. The solid line shows the braking force required to stop the vehicle when the engine has stopped relative to the gradient of the road surface. The dotted line shows the braking force required when a creep force is produced while the engine is running relative to the gradient of the road surface.

When a creep force is produced due to the restart of the engine on a downhill slope, a large braking force is required, compared to a flat road or uphill slope to prevent the vehicle moving off. According to experiment, the braking force due to brake pedal depression is effectively distributed in the dotted region of FIG. 4. Normally, the braking force when the vehicle is at rest is considerably larger than the creep force. However, it may occur that the driver releases the depressing force of the brake pedal unconsciously in an idling stop state.

A particular example of this is the case where the slope is greater than the slope recognized by the driver when the vehicle is on a downhill slope. In this case, when the brake pedal depression is weak and the restart of engine 1 is performed due to the requirement of the vehicle state, the vehicle gradually moves off due to a rotation of the drive wheels 5.

However, according to this invention, when the engine restarts due to the requirement of the vehicle state, the engine 1 does not start until the predetermined time elapses. During this predetermined time, only the induction motor 2 rotates. The creep force generated due to the induction motor 2 is smaller than the creep force due to the operation of the engine. After the predetermined time has elapsed, the engine restarts.

If the restart of the engine is performed due to the requirement of the vehicle state, the generated creep force increases gradually. If the driver feels the generation of the creep force, it is likely that the driver will depress the brake pedal. As a result, if the restart of the engine was performed due to the requirement of the vehicle state, there is little risk that the vehicle will move off. Further, in a restart of the engine due to the requirement of the vehicle state, there is no need for the vehicle to move off, and there is no problem even if it takes a little longer time than usual for the engine to start. On the other hand, when the engine restarts due to the requirement of the driver, the engine 1 starts without delay, and the vehicle can start rapidly.

As shown by the solid line in FIG. 3, when there is a restart of the engine due to the requirement of the vehicle state, the engine rotation speed due to the rotation of the induction motor 2 reaches the predetermined rotation speed, 500 rpm, in 0.15 seconds. This predetermined rotation speed is preferably set to be greater than the engine resonance frequency. By instantaneously exceeding the engine resonance frequency, unpleasant vibration due to resonance is suppressed. In the rotation speed region above the predetermined rotation speed, the engine rotation speed gradually rises to keep the generated creep force small. The engine rotation speed is set to increase gradually from startup to the predetermined time, e.g., 1.2 seconds. After this predetermined time, the engine starts. As the creep force increases in direct proportion to the square of the engine rotation speed, if the rotation speed is suppressed low, the creep force is kept small.

In order to activate the induction motor 2 due to a drop in the battery SOC, it is necessary that the battery has an extra capacity to start the motor 2. The value of the predetermined SOC to restart the engine 1 is determined in due consideration of this extra capacity.

The entire contents of Japanese Patent Applications P2000-43372 (filed Feb. 21, 2000) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An engine automatic stop/restart device for an engine of a vehicle, the vehicle having a drive wheel, and a transmission mechanism which transmits a creep force to the drive wheel according to a rotation of the engine, comprising,
   a motor for starting the engine,
   a sensor which detects if the transmission mechanism is in a drive range wherein the creep force is transmitted to the drive wheel,
   a sensor which detects that a brake pedal is depressed, and
   a microprocessor programmed to:
      stop the running of the engine automatically when the vehicle is stationary with the brake pedal depressed,
      determine whether a driver or a vehicle state requires a restart of the engine,
      restart the engine to increase a rotation speed of the engine rapidly by the motor when the driver requires the restart of the engine, and
      restart the engine to increase the rotation speed of the engine more slowly by the motor when the vehicle state requires the restart of the engine with the transmission mechanism in the drive range.

2. The engine automatic stop/restart device as defined in claim 1, wherein the microprocessor is further programmed to
   make a rate of increase in the rotation speed of the engine when the restart of the engine is performed due to a requirement of the vehicle state less than the rate of increase in the rotation speed of the engine when the restart of the engine is performed due to a requirement of the driver.

3. The engine automatic stop/restart device as defined in claim 1, wherein the microprocessor is further programmed to
   increase the rotation speed of the engine by the motor up to a predetermined rotation speed with identical characteristics when the driver requires the restart of the engine and when the vehicle state requires the restart of the engine,
   and to make the rate of increase in the rotation speed of the engine above a predetermined rotation speed less than the rate of increase in the rotation speed of the engine below the predetermined rotation speed when the vehicle state requires the restart of the engine.

4. The engine automatic stop/restart device as defined in claim 3, wherein the predetermined rotation speed is set to a higher rotation speed than the resonance frequency of the engine.

5. The engine automatic stop/restart device as defined in claim 1, wherein the creep force generated below a predetermined idling speed is set to be of approximately the same order as the drive force usually added by the increase of engine rotation speed when an air-conditioner changes over from OFF to ON, when the restart of the engine is performed due to a requirement of the vehicle state.

6. The engine automatic stop/restart device as defined in claim 1, wherein the microprocessor is further programmed to determine that the driver requires the restart of the engine when the brake pedal is released after the engine has automatically stopped.

7. The engine automatic stop/restart device as defined in claim 1, wherein the restart device further comprises a sensor which detects that an accelerator pedal is depressed, and
   the microprocessor is further programmed to determine that the driver requires the restart of the engine when the accelerator pedal is depressed after the engine has automatically stopped.

8. The engine automatic stop/restart device as defined in claim 1, wherein the restart device further comprises a sensor which detects a state of charge (SOC) of the battery, and
   the microprocessor is further programmed to determine that the vehicle state requires the restart of the engine when the battery SOC is less than a predetermined SOC after the engine has automatically stopped.

9. The engine automatic stop/restart device as defined in claim 1, wherein the restart device further comprises a sensor which detects a negative pressure of a brake booster, and
   the microprocessor is further programmed to determine that the vehicle state requires the restart of the engine when the negative pressure of the brake booster is less than a predetermined negative ,.pressure after the engine has automatically stopped.

10. The engine automatic stop/restart device as defined in claim 1, wherein the restart device further comprises a sensor which detects an engine cooling water temperature, and
    the microprocessor is further programmed to determine that the vehicle state requires the restart of the engine when the engine cooling water temperature is below a predetermined water temperature after the engine has automatically stopped.

11. The engine automatic stop/restart device as defined in claim 1, wherein the restart device further comprises a sensor which detects an oil temperature of a transmission with which the transmission mechanism is provided, and
    the microprocessor is further programmed to determine that the vehicle state requires the restart of the engine when the oil temperature is below a predetermined oil temperature after the engine has automatically stopped.

12. The engine automatic stop/restart device as defined in claim 1, wherein the restart device further comprises a sensor which detects an oil pressure of a transmission with which the transmission mechanism is provided, and
    the microprocessor is further programmed to determine that the vehicle state requires the restart of the engine when the oil pressure of the transmission is below a predetermined oil pressure after the engine has automatically stopped.

13. An engine automatic stop/restart device for an engine of a vehicle, the vehicle having a drive wheel, and a transmission mechanism which transmits a creep force to the drive wheel according to a rotation of the engine, comprising, means for detecting a drive range state of the transmission mechanism wherein the creep force is transmitted to the drive wheel, means for detecting a depression of a brake pedal means for stopping the running of the engine automatically when the vehicle is stationary with the brake pedal depressed, means for determining whether a driver or a vehicle state requires a restart of the engine, means for restarting the engine to increase a rotation speed of the engine rapidly by a motor when the driver requires the restart of the engine, and means for restarting the engine to increase the rotation speed of the engine more slowly by the motor when the vehicle state requires the restart of the engine with the transmission mechanism in the drive range.

* * * * *